United States Patent
Inuduka et al.

(10) Patent No.: US 8,319,462 B2
(45) Date of Patent: Nov. 27, 2012

(54) OUTPUT FILTER AND POWER CONVERSION APPARATUS HAVING THE SAME

(75) Inventors: Aiko Inuduka, Fukuoka (JP); Tsuyoshi Higuchi, Fukuoka (JP)

(73) Assignee: Kabushiki Kaisha Yaskawa Denki, Kitakyushu-Shi (JP)

( * ) Notice: Subject to any disclaimer, the term of this patent is extended or adjusted under 35 U.S.C. 154(b) by 0 days.

(21) Appl. No.: 13/180,518

(22) Filed: Jul. 11, 2011

(65) Prior Publication Data

US 2011/0266988 A1 Nov. 3, 2011

Related U.S. Application Data

(63) Continuation of application No. PCT/JP2010/050195, filed on Jan. 12, 2010.

(30) Foreign Application Priority Data

Jan. 13, 2009 (JP) ................................. 2009-004250

(51) Int. Cl.
*H02P 6/00* (2006.01)

(52) U.S. Cl. ......... 318/400.25; 318/400.01; 318/400.24; 318/700

(58) Field of Classification Search ............. 318/400.25, 318/400.24, 400.01, 700
See application file for complete search history.

(56) References Cited

U.S. PATENT DOCUMENTS 5,790,396 A * 8/1998 Miyazaki et al. ................ 363/96
5,831,842 A * 11/1998 Ogasawara et al. ............. 363/40

FOREIGN PATENT DOCUMENTS

| JP | 11-196565 | 7/1999 |
|----|-----------|--------|
| JP | H11-196565 | * 7/1999 |
| JP | 11-299264 | 10/1999 |
| JP | 2007-181341 | 7/2007 |
| JP | 2008-236817 | 10/2008 |

OTHER PUBLICATIONS

Japanese Office Action for corresponding JP Application No. 2010-524016, Jan. 12, 2011.
Japanese Office Action for corresponding JP Application No. 2010-524016, Mar. 17, 2011.

* cited by examiner

*Primary Examiner* — Walter Benson
*Assistant Examiner* — David Luo
(74) *Attorney, Agent, or Firm* — Ditthavong Mori & Steiner, P.C.

(57) ABSTRACT

Provided are an output filter and a power conversion apparatus having such an output filter. The output filter is configured by a neutral point detector with a reduced size and having no common mode inductance occurring by making inductances in coils of respective phases equal.

9 Claims, 10 Drawing Sheets

OUTPUT FILTER AND POWER CONVERSION APPARATUS HAVING THE SAME

CROSS-REFERENCE TO RELATED APPLICATIONS

The present application claims priority to Japanese Patent Application No. PCT/JP2010/050195, filed Jan. 12, 2010, which claims priority to Japanese Patent Application No. 2009-004250, filed Jan. 13, 2009. The contents of these applications are incorporated herein by reference in their entirety.

BACKGROUND OF THE INVENTION

1. Field of the Invention

The present invention relates to an output filter and a power conversion apparatus having the same.

2. Discussion of the Background

The conventional technique disclosed in Japanese Unexamined Patent Application Publication No. 1999-196565, for example, relates to suppression of a high frequency leakage current and a common mode voltage in a power conversion apparatus, such as an inverter, using a high speed switching device such as an IGBT or a power MOSFET, and utilizing a neutral point detecting potential transformer as a detection means for detecting a neutral point on an output side of the inverter.

SUMMARY OF THE INVENTION

According to one aspect of the present invention, a power conversion apparatus is provided with: a power converter configured to receive an alternating-current power supply and to supply electric power to drive a motor; and an output filter including: common mode choke coils each connected between an output of the power converter and the motor; and a neutral point detector configured by a magnetic core in a triangular pyramid shape, and connected between a downstream side of the common mode choke coils and a neutral point.

According to another aspect of the present invention, a power conversion apparatus is provided with: a power converter configured to receive an alternating-current power supply and to supply electric power to drive a motor; and an output filter including: common mode choke coils each connected between an output of the power converter and the motor; and a neutral point detector including coils of an U-phase, a V-phase, and a W-phase, and connected between a downstream side of the common mode choke coils and a neutral point, inductances of the coils of the respective phases being equal.

According to another aspect of the present invention, an output filter is provided with: common mode choke coils each connected between a motor and an output of a power converter that receives an alternating-current power supply and supplies electric power to drive the motor; and a neutral point detector including coils of an U-phase, a V-phase, and a W-phase, and connected between a downstream side of the common mode choke coils and a neutral point, inductances of the coils of the respective phases being equal.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
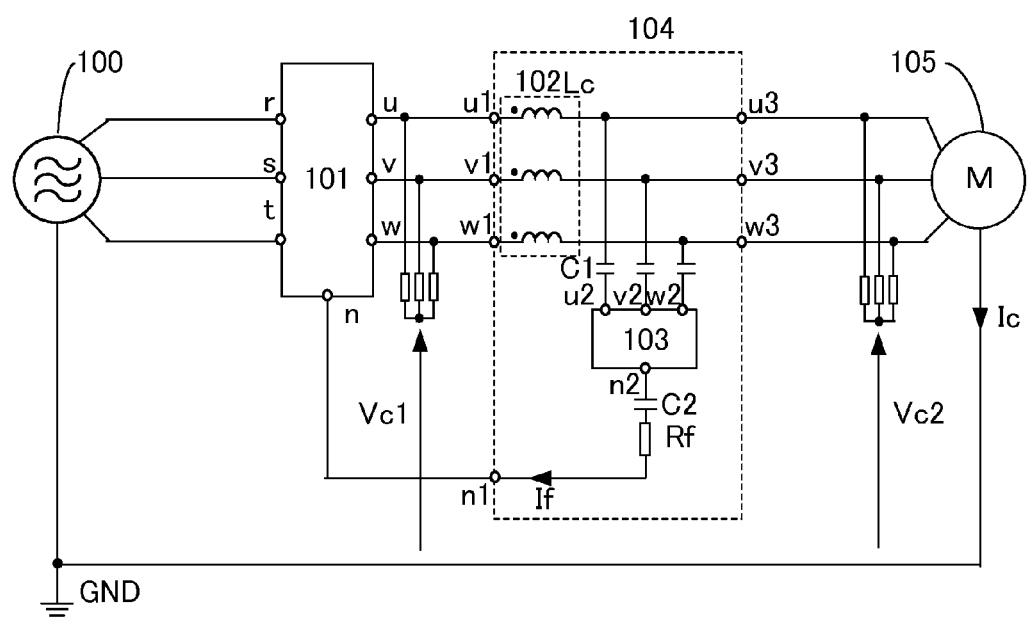
FIG. 1 is a block diagram showing a configuration of a power conversion apparatus having an output filter configured by a neutral point detector according to an embodiment of the present invention.

Embodiments will now be described with reference to the accompanying drawings, wherein like reference numerals designate corresponding or identical elements throughout the various drawings.

The following describes an embodiment according to the present invention with reference to the drawings.

FIG. 1 is a block diagram showing a configuration of a power conversion apparatus having an output filter configured by a neutral point detector according to the embodiment of the present invention. Referring to this figure, a power converter 101 receives an alternating-current power supply 100, and supplies electric power to drive an electric motor 105 based on an instruction from an upper device that is not depicted. The power converter 101 includes input terminals r, s, and t, output terminals u, v, and w, and a neutral point terminal n.

An output filter 104 is inserted between an output of the power converter 101 and the electric motor 105, and mainly provided with common mode choke coils 102, a neutral point detector 103, a bypass capacitor C2, and a resistance Rf. The output filter 104 includes input terminals u1, v1, and w1, output terminals u3, v3, and w3, and a neutral point terminal n1.

Figure 2:
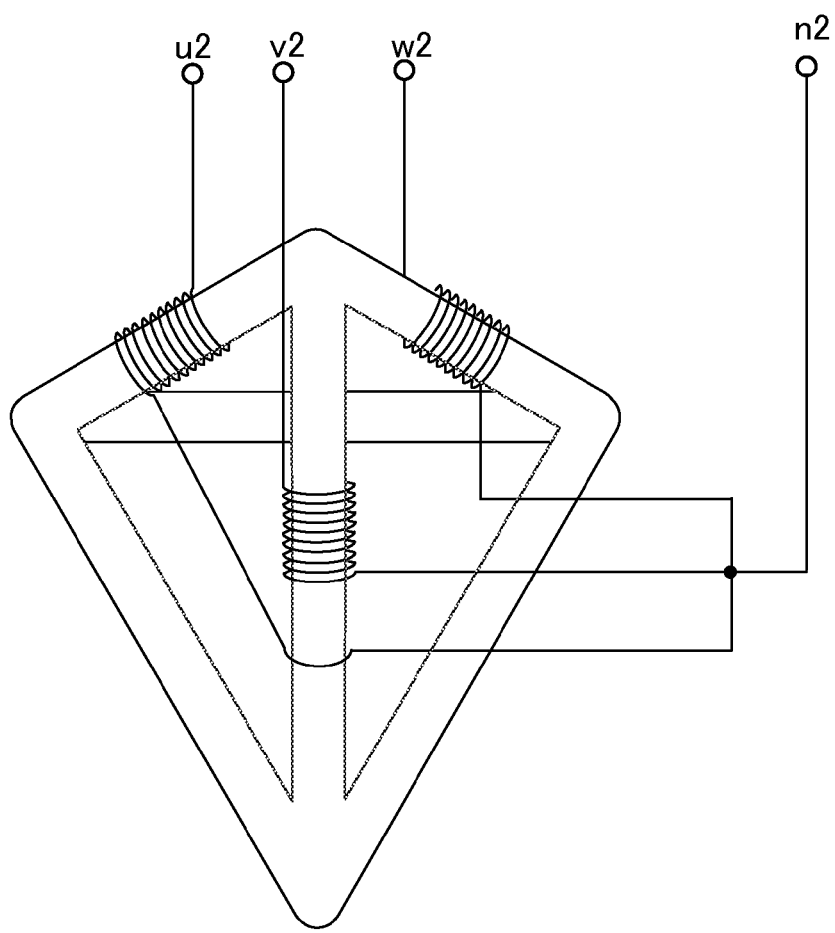
FIG. 2 is a schematic configuration view of the neutral point detector.

FIG. 2 is a schematic configuration view of the neutral point detector. Referring to this figure, the neutral point detector constitutes a magnetic core in a triangular pyramid shape, and coils of an U-phase, a V-phase, and a W-phase are wound by an identical number of times and in an identical direction, for example, as shown in the figure. The neutral point detector includes terminals u2, v2, w2, and n2.

The output filter 104 in FIG. 1 is provided with the common mode choke coils 102 respectively connected in series between outputs of the power converter 101 of the U-phase, the V-phase, and the W-phase and inputs of the electric motor 105 of the U-phase, the V-phase, and the W-phase, capacitors C1 of the respective phases connected in parallel in the U-phase, the V-phase, and the W-phase, the neutral point detector 103 in which one end of the coil of each phase is connected to the capacitor C1 of the corresponding phase, and the other ends of the coils of the respective phases are connected in a star connection to provide a neutral point n2, and the capacitor C2 and the resistance Rf that are connected in series to the neutral point n2.

One end of the resistance Rf is connected to the capacitor C2, and the other end of the resistance Rf is connected to the neutral point terminal n1. Further, the neutral point terminal n1 of the output filter 104 is connected to the neutral point terminal n of the power converter 101. In this case, resistances that are respectively connected in parallel in the U-phase, V-phase, and the W-phase in the power converter 101 in FIG. 1, and resistances that are respectively connected in parallel in the U-phase, V-phase, and the W-phase in the electric motor 105 are provided to measure common mode voltages Vc1 and Vc2, respectively.

The common mode voltages Vc1 and Vc2 are applied respectively between GND and the U-phase, V-phase, and W-phase. Further, a common mode current Ic is a current that flows into GND via the electric motor 105. Moreover, a filter current If is a current that flows into the neutral point terminal n of the power converter 101 via the neutral point terminal n1 of the output filter 104.

Figure 3A:
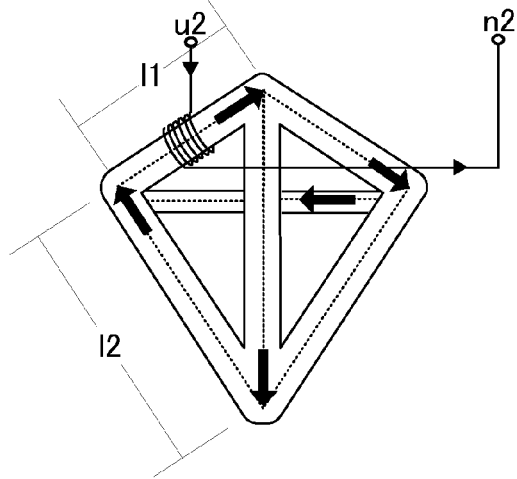
FIG. 3A is a view showing a magnetic flux path that occurs due to a current flowing through an U-phase coil of the neutral point detector.
Figure 3B:
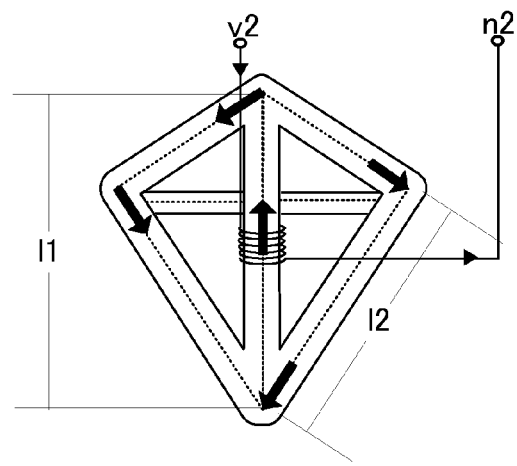
FIG. 3B is a view showing a magnetic flux path that occurs due to a current flowing through a V-phase coil of the neutral point detector.
Figure 3C:
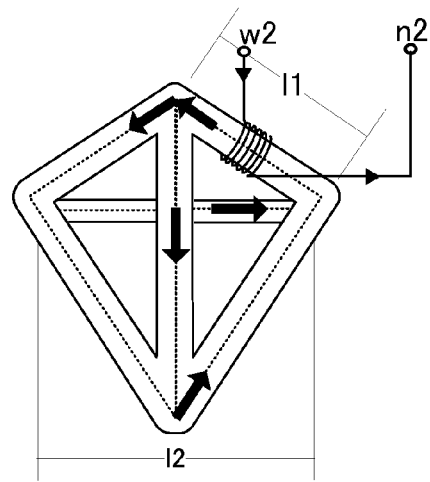
FIG. 3C is a view showing a magnetic flux path that occurs due to a current flowing through a W-phase coil of the neutral point detector.

FIG. 3A is a view showing a magnetic flux path that occurs due to a current flowing through the U-phase coil of the neutral point detector. FIG. 3B is a view showing a magnetic flux path that occurs due to a current flowing through the V-phase coil of the neutral point detector. FIG. 3C is a view showing a magnetic flux path that occurs due to a current flowing through the W-phase coil of the neutral point detector.

Referring to the figures, in the neutral point detector that constitutes the magnetic core in a triangular pyramid shape, lengths of the magnetic flux paths of the three phases are the same, and therefore magnetic fluxes are balanced in the all phases. Consequently, there is no inductance in the coils in the common mode.

Figure 4:
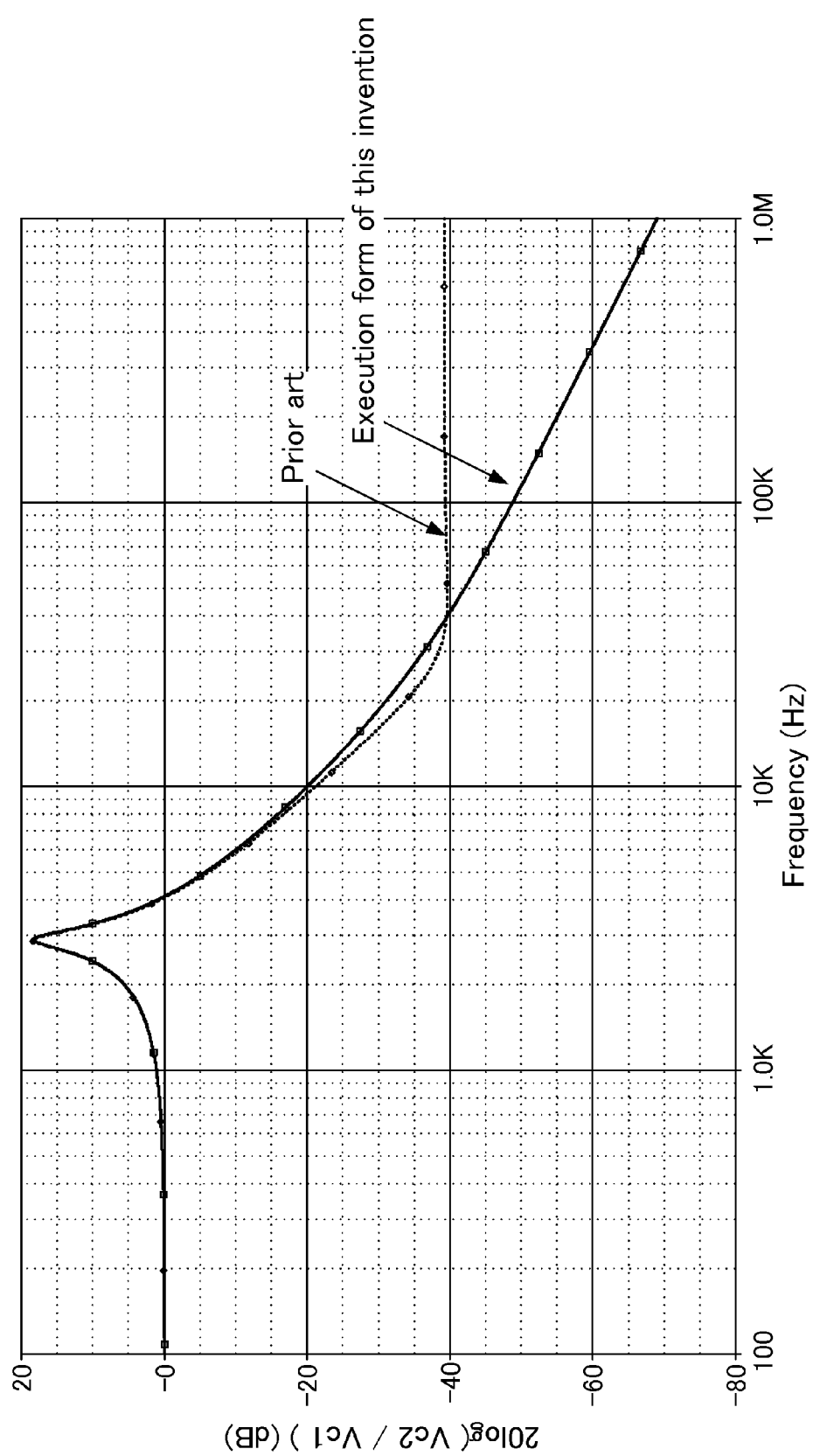
FIG. 4 is a chart showing a result of calculation of a gain of an output filter of a power converter in a common mode.

FIG. 4 is a chart showing a result of calculation of a gain of an output filter of the power converter in the common mode. Referring to this figure, gain characteristics of an output filter configured by a typical neutral point detector, and an output filter configured by the neutral point detector according to this embodiment are compared. The vertical axis indicates a ratio between the common mode voltage Vc1 on an input side and the common mode voltage Vc2 on an output side of the output filter 104, and the horizontal axis indicates frequencies.

As described above, as the inductances in the coils in the common mode are substantially zero in the neutral point detector according to this embodiment, it can be seen that the gain characteristics improve in a high frequency region. Specifically, in the high frequency region where the frequency is about 30 kHz or greater, the common mode voltage Vc2 with respect to the common mode voltage Vc1 is sufficiently attenuated.

Figure 5A:
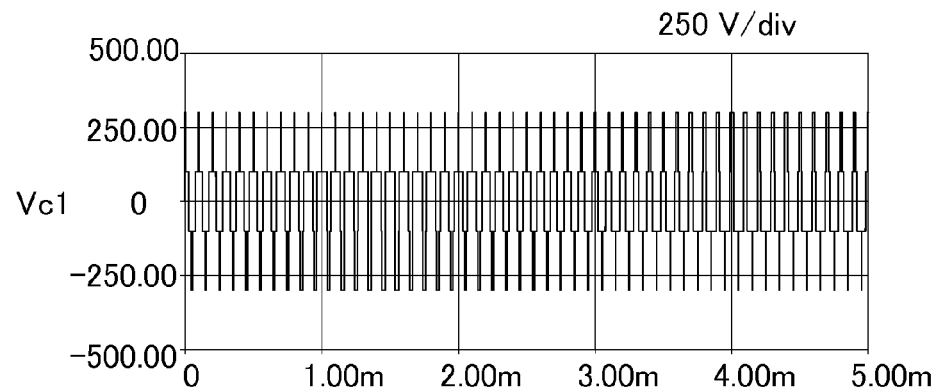
FIG. 5A shows waveform charts of a common mode voltage and a common mode current of a power conversion apparatus having no output filter.
Figure 5A:
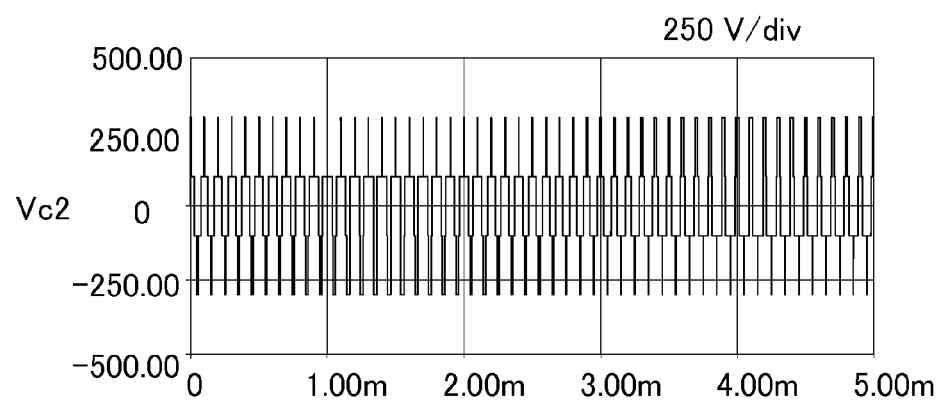
Figure 5A:
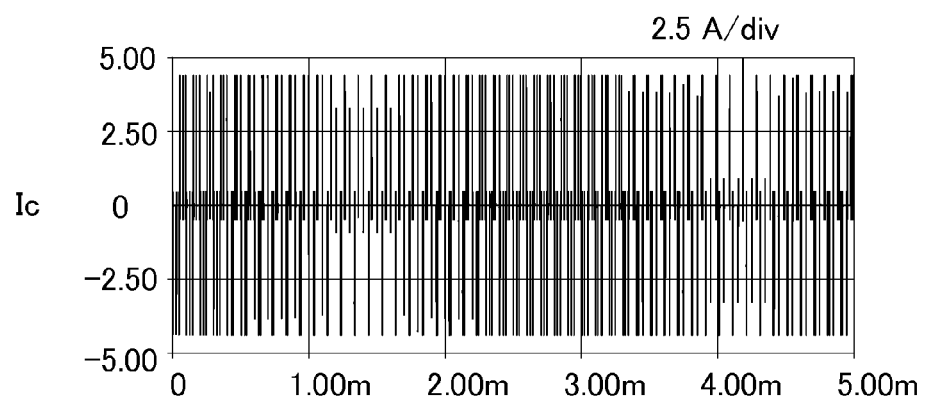
Figure 5B:
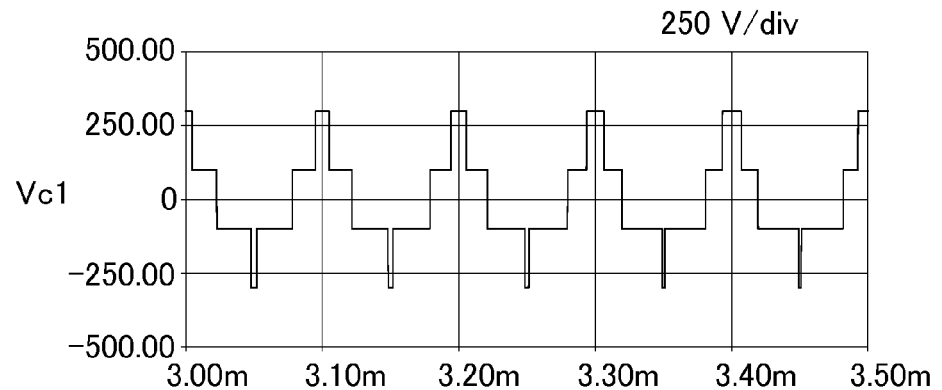
FIG. 5B shows enlarged charts of FIG. 5A.
Figure 5B:
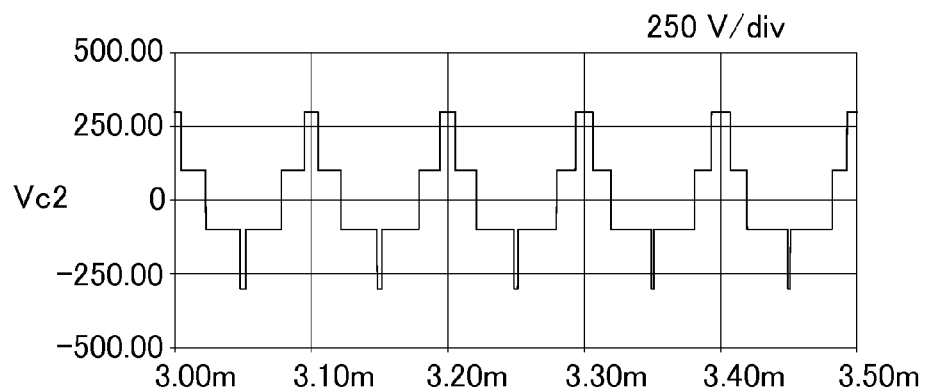
Figure 5B:
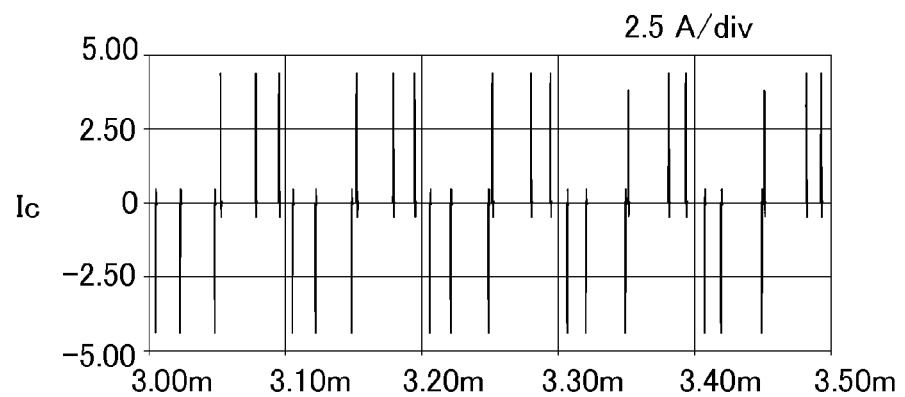

FIG. 5A shows waveform charts of a common mode voltage and a common mode current of a power conversion apparatus having no output filter. FIG. 5B shows enlarged charts of FIG. 5A. The vertical axis indicates amplitudes of the voltage and the current, and the horizontal axis indicates time.

Figure 6A:
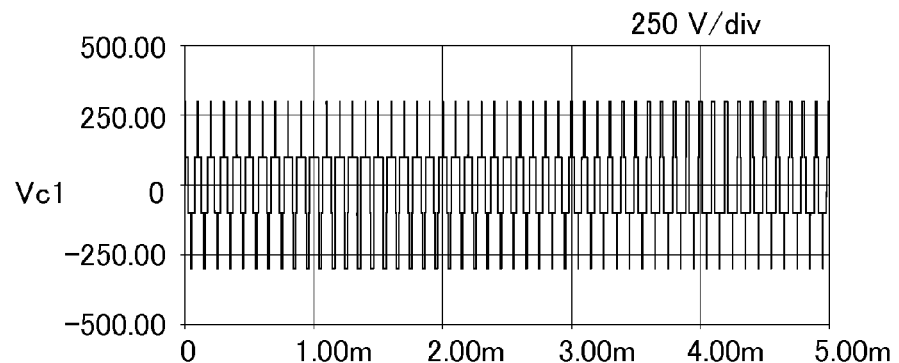
FIG. 6A shows waveform charts of a common mode voltage and a common mode current of the power conversion apparatus having the output filter configured by the neutral point detector according to the embodiment of the present invention.
Figure 6A:
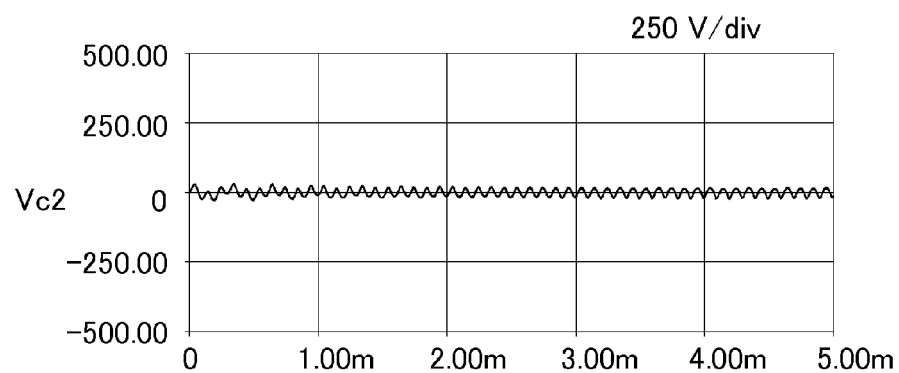
Figure 6A:
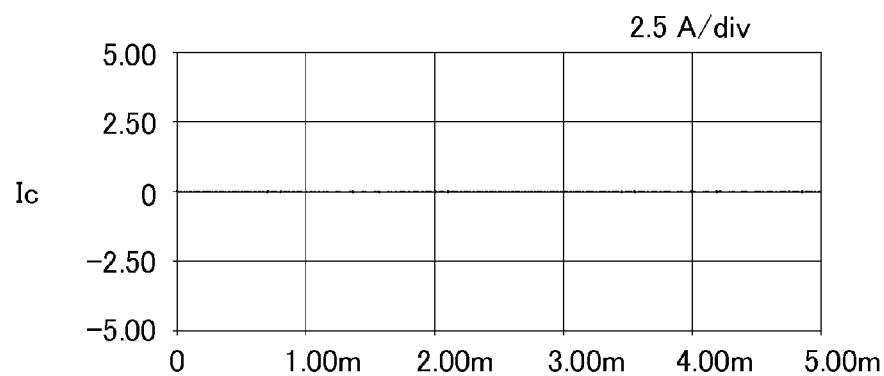
Figure 6B:
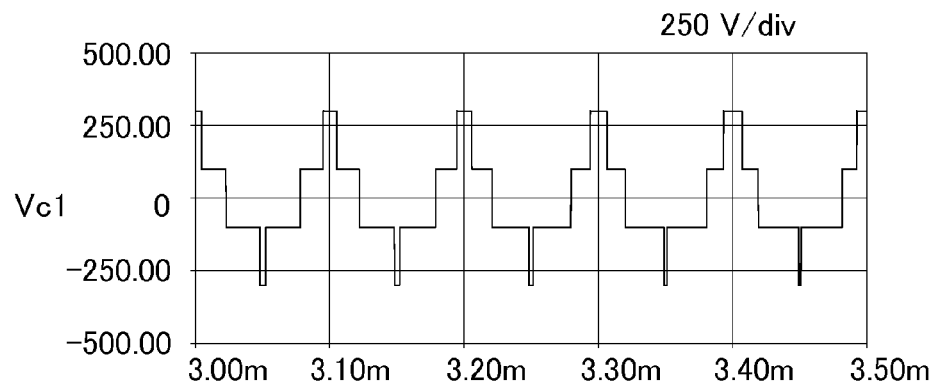
FIG. 6B shows enlarged charts of FIG. 6A.
Figure 6B:
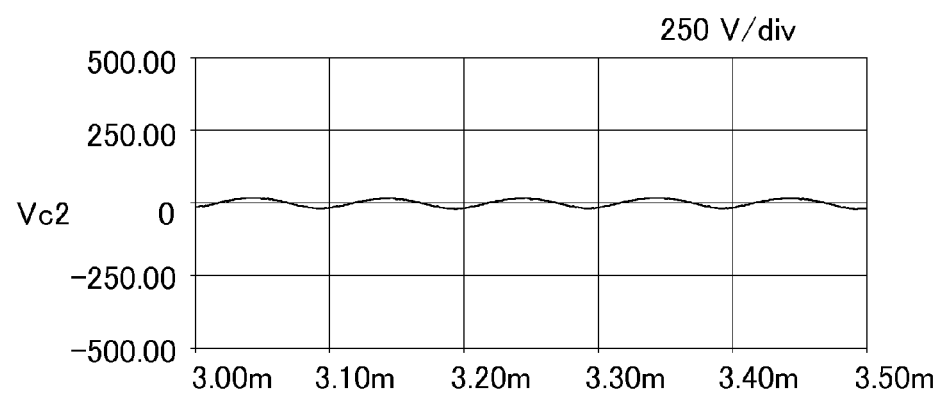
Figure 6B:
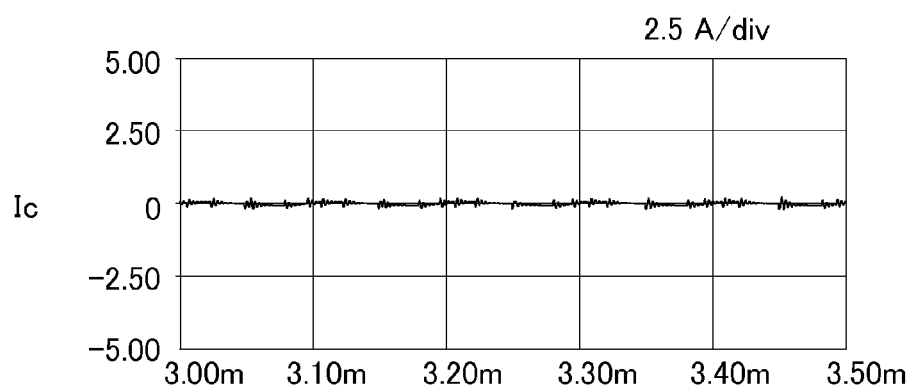

FIG. 6A shows waveform charts of a common mode voltage and a common mode current of the power conversion apparatus having the output filter configured by the neutral point detector according to this embodiment. FIG. 6B shows enlarged charts of FIG. 6A. The vertical axis indicates amplitudes of the voltage and the current, and the horizontal axis indicates time.

Simulation conditions for each waveform chart are: a carrier frequency of the power conversion apparatus is 10 kHz, and an operation frequency is 30 Hz.

Referring to FIG. 5A and FIG. 5B, when an output filter is not provided, the common mode voltages Vc1 and Vc2 both show a pulsed voltage waveform whose fundamental wave is the carrier frequency, and whose common mode current Ic is a high frequency current.

Referring to FIG. 6A and FIG. 6B, when providing the output filter according to this embodiment, as the gain characteristics of the output filter shown in FIG. 4 is about −20 dB at 10 kHz, the common mode voltage Vc2 with respect to a carrier component (10 kHz) is reduced down to about one-tenth of the common mode voltage Vc1.

Further, as the neutral point detector of this embodiment is configured such that all the inductances in the coils of the respective phases are equal and the common mode inductance is substantially zero along with this, the gain characteristics of the output filter in the high frequency region improve, and a high frequency component in the common mode current Ic can be completely reduced.

Figure 7A:
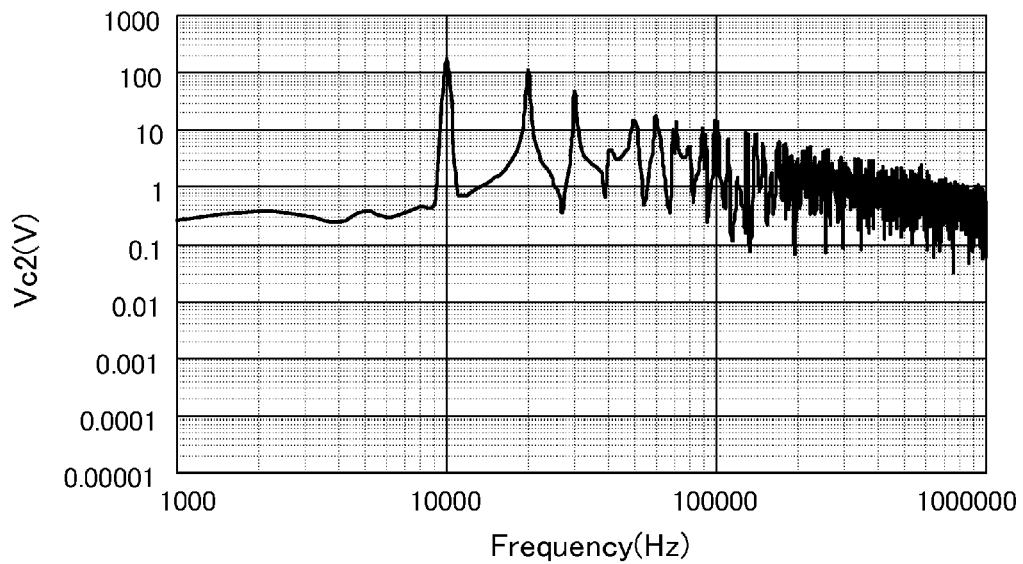
FIG. 7A is a chart showing a result of a frequency analysis of a common mode voltage Vc2 in a case where an output filter is not provided.
Figure 7B:
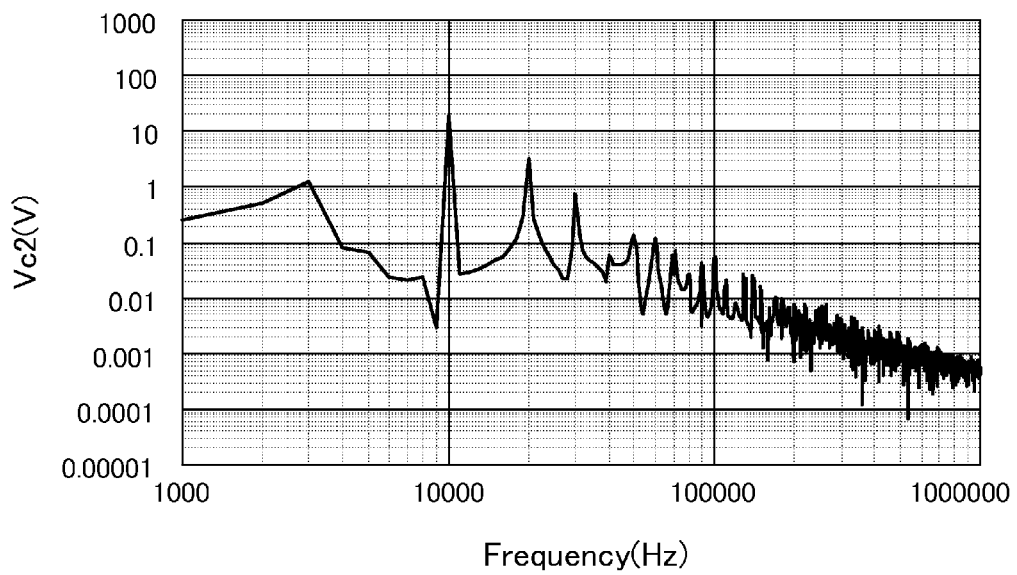
FIG. 7B is a chart showing a result of a frequency analysis of the common mode voltage Vc2 in a case where the output filter according to the embodiment of the present invention is provided.

FIG. 7A is a chart showing a result of a frequency analysis of the common mode voltage Vc2 in a case where an output filter is not provided. FIG. 7B is a chart showing a result of a frequency analysis of the common mode voltage Vc2 in a case where the output filter according to the embodiment of the present invention is provided. The vertical axis indicates amplitudes of the common mode voltage Vc2, and the horizontal axis indicates frequencies.

Figure 8A:
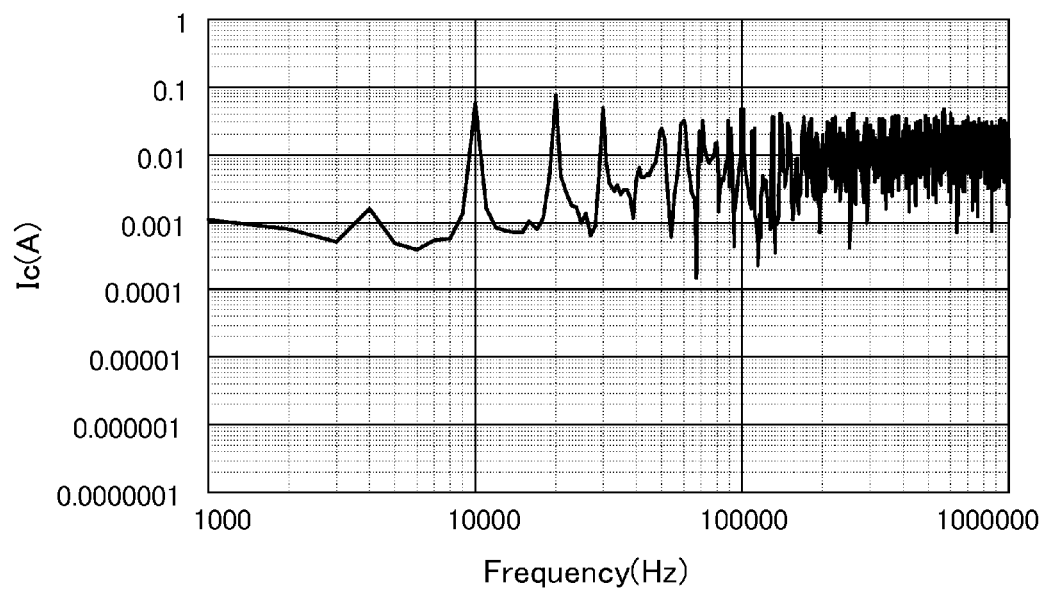
FIG. 8A is a chart showing a result of a frequency analysis of a common mode current Ic in the case where an output filter is not provided.
Figure 8B:
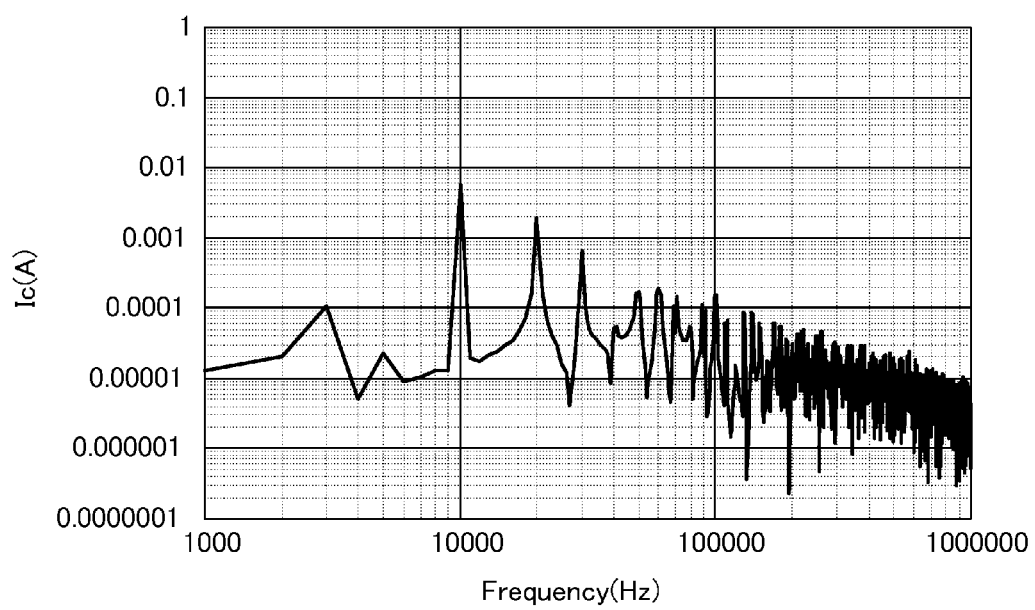
FIG. 8B is a chart showing a result of a frequency analysis of the common mode current Ic in the case where the output filter according to the embodiment of the present invention is provided.

FIG. 8A is a chart showing a result of a frequency analysis of the common mode current Ic in the case where an output filter is not provided. FIG. 8B is a chart showing a result of a frequency analysis of the common mode current Ic in the case where the output filter according to the embodiment of the present invention is provided. The vertical axis indicates amplitudes of the common mode current Ic, and the horizontal axis indicates frequencies.

The common mode voltage Vc2 is a voltage whose fundamental wave is the carrier frequency (f=10 kHz). Further, the common mode current Ic is a current whose fundamental wave is the carrier frequency (f=10 kHz).

Referring to FIG. 7A and FIG. 7B, the common mode voltage Vc2 is reduced down to about one-tenth of the carrier component (10 kHz). In addition, the high frequency component (f≧100 kHz) is reduced even more.

Referring to FIG. 8A and FIG. 8B, the common mode current Ic is reduced down to about one-tenth of the carrier component (10 kHz). In addition, the high frequency component (f≧100 kHz) is reduced even more. This is realized because, as the neutral point detector of this embodiment is configured such that all the inductances in the coils of the respective phases are equal and the common mode inductance is substantially zero along with this, the gain characteristics of the output filter in the high frequency region improve.

As described above, according to the power conversion apparatus having the output filter configured by the neutral point detector of this embodiment, when all the inductances in the coils of the respective phases of the neutral point detector are equal, there is no common mode inductance at all, and therefore the gain characteristics of the output filter in the high frequency region improve.

Accordingly, it is possible to reduce the high frequency component in the common mode voltage and common mode current.

Further, as the common mode choke coils used in the output filter can be downsized, the output filter can also be downsized. This consequently makes it possible to provide the output filter within the power conversion apparatus, and thus to utilize such an output filter in a power conversion apparatus having a built-in output filter.

Moreover, as the gain characteristics of the output filter in the high frequency region improve, it is possible to facilitate a measure against noise.

Furthermore, as a downstream coil is not necessary, the neutral point detector can be downsized.

Obviously, numerous modifications and variations of the present invention are possible in light of the above teachings. It is therefore to be understood that within the scope of the appended claims, the invention may be practiced otherwise than as specifically described herein.

What is claimed as new and is desired to be secured by Letters Patent of the United States is:

1. A power conversion apparatus comprising:
   a power converter configured to receive an alternating-current power supply and to supply electric power to drive a motor; and
   an output filter including:
   common mode choke coils each connected between an output of the power converter and the motor; and
   a neutral point detector configured by a magnetic core in a triangular pyramid shape, and connected between a downstream side of the common mode choke coils and a neutral point.

2. The power conversion apparatus according to claim 1, wherein
   the neutral point detector includes coils of an U-phase, a V-phase, and a W-phase, the coils being separately wound around the magnetic core by an identical number of times and in an identical direction.

3. The power conversion apparatus according to claim 1, wherein
   the neutral point detector includes coils of an U-phase, a V-phase, and a W-phase, one end of each coil being connected to the downstream side of each of the common mode choke coils, the other ends of the respective coils being connected in a star connection to the neutral point via a capacitor and a resistance that are connected in series.

4. A power conversion apparatus comprising:
   a power converter configured to receive an alternating-current power supply and to supply electric power to drive a motor; and
   an output filter including:
   common mode choke coils each connected between an output of the power converter and the motor; and
   a neutral point detector including coils of an U-phase, a V-phase, and a W-phase, and connected between a downstream side of the common mode choke coils and a neutral point, inductances of the coils of the respective phases being equal,
   wherein the neutral point detector is configured such that one end of each of the coils of the U-phase, the V-phase, and the W-phase is connected to the downstream side of each of the common mode choke coils, and the other ends of the respective coils are connected in a star connection to the neutral point via a capacitor and a resistance that are connected in series.

5. The power conversion apparatus according to claim 4, wherein
   the neutral point detector is configured such that the coils of the U-phase, the V-phase, and the W-phase are separately wound around a magnetic core by an identical number of times and in an identical direction.

6. The power conversion apparatus according to claim 4, wherein
   the neutral point detector is configured by a magnetic core in a triangular pyramid shape.

7. An output filter comprising:
   common mode choke coils each connected between a motor and an output of a power converter that receives an alternating-current power supply and supplies electric power to drive the motor; and
   a neutral point detector including coils of an U-phase, a V-phase, and a W-phase, and connected between a downstream side of the common mode choke coils and a neutral point, inductances of the coils of the respective phases being equal,
   wherein the neutral point detector is configured such that one end of each of the coils of the U-phase, the V-phase, and the W-phase is connected to the downstream side of each of the common mode choke coils, and the other ends of the respective coils are connected in a star connection to the neutral point via a capacitor and a resistance that are connected in series.

8. The output filter according to claim 7, wherein
   the neutral point detector is configured such that the coils of the U-phase, the V-phase, and the W-phase are separately wound around a magnetic core by an identical number of times and in an identical direction.

9. The output filter according to claim 7, wherein
   the neutral point detector is configured by a magnetic core in a triangular pyramid shape.

* * * * *